United States Patent Office 3,246,218
Patented Apr. 12, 1966

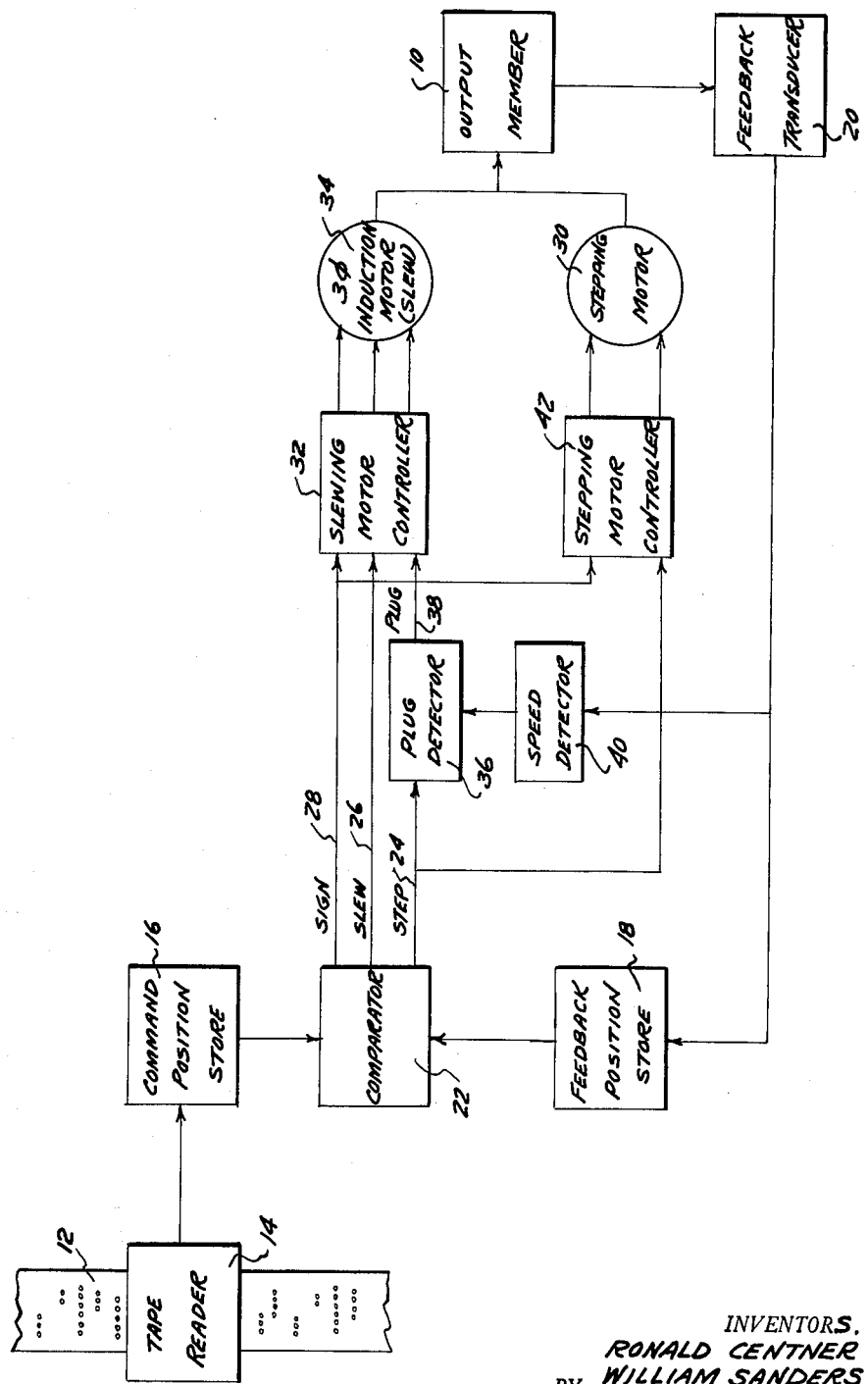

3,246,218
PLURAL MOTOR DUAL SPEED POSITIONING
SYSTEM TRANSITION CONTROL
Ronald Centner, Royal Oak, and William J. Sanders,
Pontiac, Mich., assignors to The Bendix Corporation,
Detroit, Mich., a corporation of Delaware
Filed Oct. 10, 1962, Ser. No. 229,537
3 Claims. (Cl. 318—8)

This invention relates to electronic systems for controlling the position of an output member and more particularly to point-to-point control systems.

Electronic systems for moving an output member from one point to another without regard to the nature of the intermediate path are well known and a group of such systems is described in the publication 31 Numerically Controlled Point-to-Point Positioning Systems by McGraw-Hill Publishing Company. Many of these systems position the output member by initially moving it at a high speed, termed a "slewing" motion, and then switching to a lower "fine" positioning speed when the output member is within a short predetermined distance of its final position. This allows the output member to arrive at its final position at a low speed and thereby minimize the possibility of overshoot while traversing the entire positioning distance at a relatively high speed. Separate motors are often employed to power the slewing and fine motions and stepping motors are sometimes used for the fine motion.

The present invention relates to a positioning control system of this latter type and is particularly addressed to the problem of terminating the slewing motion quickly so that it does not cause large overshoot of the final position before the speed reduces to a value equal to that provided by the fine motion. By terminating the slewing motion in a minimum time the distance from the final point at which termination is initiated may be minimized thereby maximizing the portion of the control path which is handled by the slewing motion and maximizing the average rate of motion of the system between the initial and final points.

Since the control system must be capable of moving its output member in either direction the motor which drives the output member at the slewing rate is reversible. The broad technique of the present invention is to instantaneously apply a reversing signal to the slewing motor when the end point of the slewing motion has been reached. This "plugging" technique will act to dynamically brake the slewing motion. However, if the reversing action is continued the slewing motion will not only slow to a stop but will proceed in the reverse direction which is clearly undesirable. Therefore, the present invention provides means for sensing the rate of motion of the output member and for terminating the plugging action when this rate has decreased to a velocity such that the final point can be reached in minimum time. This threshold velocity will be a function of the dynamics of the particular system, and may range from near zero to somewhat greater than the rate of movement caused by the fine motor but considerably less than the full slewing speed.

It is therefore seen to be an object of the present invention to provide a dual speed point-to-point positioning system wherein the transition from the slewing motion to the fine motion is accompanied by a plugging of the slewing motor until the speed of the output member decreases to a value which results in minimum settling time.

All closed-loop positioning systems employ a feedback transducer which generates electrical signals indicative to the motion of the output member so that the output member's position may be compared with its desired position in order to signal both the transition from slewing to fine motion and the end point of the fine motion.

The present invention utilizes the signals provided by the feedback device for detecting the speed of the output member for the purpose of terminating the plugging motion. If the control system must be capable of moving through increments of motion which are less than the fine distance it is necessary to provide a system which will not plug the slewing motor whenever the fine motion is initiated but will only plug when the transition has been made from slewing into fine motion. It is a further object of the present invention to provide circuitry of this nature.

Other objects, advantages and applications will be made apparent by the following detailed description of a preferred embodiment of the invention. The description makes reference to the accompanying drawing which constitutes a block diagram of the system.

Referring to the drawing, the system is operative to control the position of an output member 10 that normally takes the form of a machine tool component such as the table of a fixed-spindle drill press. Means may be provided for moving the output 10 along a plurality of axes either sequentially or simultaneously and the preferred embodiment describes the control for one axis.

The output member is moved in accordance with directions on an information source such as a punched tape 12. The tape contains a plurality of series of holes and their arrangements are translated into electrical signals by a tape reader 14. Each group of holes represents the coded signal for a position to be assumed by the output member 10. It should be understood that other types of information sources such as magnetic tapes or selector switches may be employed to provide input information into the system.

The electrical signals developed by the tape reader 14 are transmitted to a command position storage unit 16 which acts to decode the signals and generate an electrical signal which is the analog of a particular position to be assumed by the output member 10.

Similarly, the analog of the instantaneous actual position of the output member 10 is retained in a feedback position storage unit 18. The feedback storage unit 18 receives information relating to either the motion or absolute position of the output member 10 from a feedback transducer 20 physically connected either to the output member or to some part that moves with it. The feedback transducer may supply incremental motion such as pulses indicative of the travel of the output member to the feedback storage unit 18 which will then accumulate this information to provide the actual position. Alternatively, the feedback transducer may take the form of a device providing absolute information such as a synchro or potentiometer.

The information contained in the command position unit 16 and the feedback unit 18 is supplied to a comparator 22 which determines the difference between the desired position as retained in the command position store and the actual position contained in the feedback store 18. The comparator 22 then provides output signals on three lines 24, 26 and 28. If the difference between the command position and the feedback position is greater than zero but less than a predetermined amount, an appropriate signal is sent out on the line 24 which commands the motor system (subsequently described) to step the output member. If the difference between the command position and the feedback position is greater than the predetermined amount a signal is sent on line 26 commanding the motor to slew the output member. A signal on line 28 indicates the direction of the difference and acts to control the direction of motion of the motor system.

The stepping signal on line 24 is fed to controller 42 which energizes a stepping motor 30 that is physically connected to the output member 10. The stepping motor also receives the signal on line 28 controlling its direction of rotation. While a stepping motor is used for fine positioning in this preferred embodiment it is to be understood that other recognized types of motor arrangements may be employed. The stepping motor acts to incrementally adjust the motion of the output member 10 in such direction as to decrease the difference between the command position and the feedback position. When the command position and the feedback position are equal the signal is removed from the line 24 and the motor system halts. It is possible for the stepping motor to cause the output member 10 to overshoot its desired position in which case the difference between the feedback position and the command position will change its sign and the stepping motor will be caused to rotate in the opposite direction until accord is reached between the two signals.

When the difference between the command position and the feedback position exceeds a predetermined amount, a signal is transmitted on line 26 to a motor controller 32 determining the energization of a three-phase induction motor 34. Any type of reversible motor may be used for slewing. Controller 32 also controls the direction of energization of the motor 34 in accordance with the sign signal contained on line 28.

In the normal operation of the system the tape reader 14 will read a series of holes in the tape 12 and provide a new command position to the unit 16. The command position will normally differ from the feedback position as stored in the unit 18 and the difference will be assumed to be sufficient to cause the comparator to generate a signal on line 26 directing the controller 32 to energize the slewing motor 34. Simultaneously a sign will be generated on line 28 indicating the direction of the difference sensed by the comparator 22. The motor 34 will then cause the output member 10 to move in such a direction as to change the feedback store 18 to bring it into accord with the command position stored in the unit 16. When the output member 10 has moved to within a predetermined distance of its desired position as indicated in the command store 16, the comparator 22 will terminate the signal on line 26 and generate a stepping signal on line 24. The stepping motor 30 will then begin to move the output member 10 in an appropriate direction.

In order to stop the three-phase induction motor 34 from exceessive coasting after its energization has been terminated the controller 32 acts to instantaneously reverse the energization of the motor 34. It does this under the control of a plug detector 36. The detector 36 provides an output on line 38 to the motor controller 32 whenever it receives a step signal on line 24 from the comparator 22 and a speed detector 40 indicates that the output member 10 is moving at above a predetermined rate.

The speed detector 40 operates on a signal received from the feedback transducer 20. If the feedback transducer is of the incremental type, the speed detector averages the transducer's pulse signal to generate a voltage proportional to the speed of the output member.

If the feedback transducer is of the absolute type the detector 40 differentiates the feedback signal to determine its rate of change and thus the rate of motion of the output member 10. In either event the analog signal proportional to the speed acts to provide an output to the plug detector 36 if it is above an adjustable predetermined level. This predetermined level may be detected by well-known circuitry such as a Schmitt trigger circuit or a Zener diode circuit.

Thus the plug detector 36 provides a signal to the motor controller 32 whenever the system is in stepping mode and the speed of the output member is above the predetermined level. The operative level of the speed detector 40 is adjusted to a point which provides minimum settling time for the particular system dynamics.

The plugging signal on the line 38 causes the motor controller 32 to energize the motor 34 in a direction opposite to that which would normally be indicated by the signal on the line 28. This acts to dynamically brake the slewing motor 34 and thus slow the motion of the output member 10. When the speed of the output member has been reduced by this plugging to a point at which the speed detector 40 is de-actuated, the plugging signal is removed from the line 38 and all energization of the motor 34 is terminated. The stepping motor 30 then continues its action until the output member 10 is brought to its desired position.

This dynamic braking technique may be used with any reversible slewing motor. It is applicable in systems which only employ a single drive motor which may be operated at two distinct speed levels as well as in systems wherein separate motors are provided for slew and fine motion.

Having thus described our invention, we claim:

1. A point-to-point positioning system for an output member including: a drive system for the output member having a high speed and a low speed; a feedback transducer mechanically coupled to the output member and operative to provide a feedback signal from which the position of the output device may be determined; and a control system operative to signal the drive system to move at a high speed when the output member is above a predetermined distance away from its desired position and a low speed when the output member is within said predetermined distance of its output position, said control system including means for sensing the signal from the feedback transducer to determine the rate of motion of the output member and means for reversing the normal direction of energization of the drive system when the control system is commanding the drive system to move at its slow speed and the speed of the output member is above a predetermined rate.

2. The positioning system of claim 1 wherein the feedback transducer provides an electrical signal representative of the absolute position of the output member and the means for sensing signal from the feedback transducer to determine the rate of motion of the output member constitutes a differentiating circuit.

3. The positioning system of claim 2 wherein the feedback transducer provides a signal representative of incremental motion of the output member and the means for sensing the signal from the feedback transducer to determine the rate of motion of the output member constitutes an averaging circuit.

References Cited by the Examiner

UNITED STATES PATENTS

| | | | |
|---|---|---|---|
| 2,674,706 | 4/1954 | Knosp et al. | 318—8 |
| 2,751,535 | 6/1956 | Kuhnel | 318—19 |
| 2,767,363 | 10/1956 | Chubb | 318—369 X |
| 2,830,246 | 4/1958 | Thomas | 318—46 |
| 2,864,010 | 12/1958 | Rosenberg et al. | 318—28 X |
| 2,945,995 | 7/1960 | Wail | 318—19 |
| 3,088,060 | 4/1963 | Ricke | 318—19 |
| 3,089,988 | 5/1963 | Stillings | 318—19 |

FOREIGN PATENTS

| | | |
|---|---|---|
| 639,817 | 7/1950 | Great Britain. |
| 741,841 | 12/1955 | Great Britain. |

ORIS L. RADER, *Primary Examiner.*

MILTON O. HIRSHFIELD, T. LYNCH,
*Assistant Examiners.*